July 28, 1959   E. E. TURNER   2,896,449
FLUID FLOW METERS
Filed Jan. 27, 1954   2 Sheets-Sheet 1

INVENTOR
EDWIN E. TURNER
BY
ATTORNEY

July 28, 1959  E. E. TURNER  2,896,449
FLUID FLOW METERS

Filed Jan. 27, 1954  2 Sheets-Sheet 2

INVENTOR
EDWIN E. TURNER
BY
ATTORNEY

United States Patent Office 2,896,449
Patented July 28, 1959

2,896,449

FLUID FLOW METERS

Edwin E. Turner, West Roxbury, Mass., assignor to Raytheon Company, a corporation of Delaware Application January 27, 1954, Serial No. 406,454

15 Claims. (Cl. 73—181)

This is a continuation-in-part of application, Serial No. 47,879, filed September 4, 1948, now abandoned.

This invention relates generally to the measurement of the velocity of a flowing fluid, and in particular to novel means for performing such measurement.

It is an object of this invention to provide improved fluid velocity measuring means which requires no orifices, pressure diaphragms, or other pressure comparison devices.

It is another object to provide such means that can be constructed and maintained sealed and impervious to the fluid wherein it is immersed for measurement.

It is another object to provide such means which, when immersed in a flowing fluid, will undergo a change in a measurable characteristic, which change will be due substantially solely to the fact that the fluid is in motion with respect thereto.

It is still another object to provide such means wherein said characteristic is conveniently measured at a remote location.

It is a particular object of the invention to provide improved, rugged, versatile, and reliable means for measuring the speed of ships and the like through the water.

Another particular object is to provide such speed measuring means which is readily adaptable to provide simultaneous information about sidewise drift as well as speed forward.

To accomplish the foregoing and other objects, the invention contemplates essentially the employment of an electroacoustic transducer immersed in the flowing fluid whereof the velocity with respect to the transducer is to be measured, said transducer being adapted to furnish compressional wave energy along a directive axis substantially parallel to the direction of fluid flow. It is convenient for this purpose to employ a directional transducer having a planar vibratory diaphragm whereof all the incremental elements are driven in substantially the same phase (i.e.: operated as a piston) at a frequency such that a lineal dimension across the diaphragm is everywhere many wavelengths long. There are also provided a source of energy for the transducer, and means for measuring the radiation resistance thereof. It has been discovered that the radiation resistance of an electroacoustic transducer which is immersed in a fluid is different when the fluid is in motion with respect thereto than when there is no relative motion, provided the transducer is furnishing compressional waves in a direction substantially parallel to the direction of fluid flow. The radiation resistance increases when the fluid in front of the transducer approaches the vibrating surface of the transducer and decreases when said fluid moves away. The change is continuously proportional to the relative velocity between the transducer and the fluid. When the fluid approaches the vibrating surface of the transducer, it apparently carries with it previously generated waves that are seeking to escape from the transducer. In the sense that the moving fluid prevents such waves from escaping in the same fashion as when there is no relative motion, it is believed that the approaching fluid causes the transducer to experience increased difficulty in casting off or radiating energy. That is to say, the approaching fluid causes the transducer, which is sending energy in the direction opposite to the direction of fluid flow, to experience an increase in radiation resistance. Similarly, if the vibrating surface of the transducer is facing toward a fluid sound medium that is receding therefrom, there is an apparent decrease in the radiation resistance. Measurement of the change in radiation resistance provides a measurement of fluid velocity with respect to the transducer.

Other objects and features of the invention will become apparent from the detailed description of certain preferred embodiments thereof that follows. The description refers to the accompanying drawing, wherein.

Figure 1:
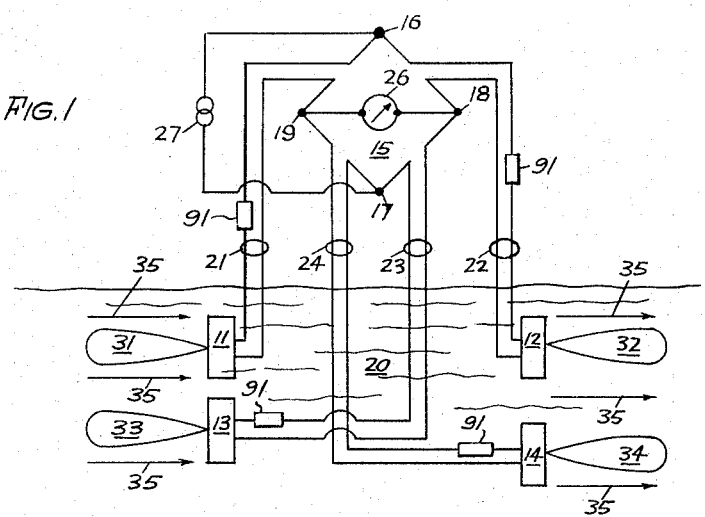
Fig. 1 is a diagram illustrating one embodiment of the invention.

Referring now to Fig. 1, four directive electroacoustic transducers 11, 12, 13, and 14 are arrayed in a Wheatstone bridge circuit 15 having four junction points 16, 17, 18, and 19. Transducer 11 is connected to points 16 and 19 by a two wire cable 21; transducer 12 is connected to points 16 and 18 by a two wire cable 22; transducer 13 is connected to points 17 and 18 by a two wire cable 23; and transducer 14 is connected to points 17 and 19 by a two wire cable 24.

The transducers are relatively so positioned or arrayed that the two in one pair of opposite bridge arms, for example 11 and 13, have their beams 31 and 33, respectively, aimed in one direction, and the other two 12 and 14 have their beams 32 and 34, respectively, aimed in the opposite direction. The entire array of transducers is immersed in the flowing fluid 20 whereof the velocity is to be measured, with the transducer beams 31 to 34, inclusive, all directed substantially parallel to the direction of flow, which is indicated by arrows 35. The fluid thus approaches the pair of transducers, here 11 and 13, in one pair of opposite arms of the bridge 15 and recedes from the other pair 12 and 14. The two transducers 11 and 13 that are approached by the fluid send their energy in a direction opposite to the direction of fluid flow, while the other two transducers from which the fluid recedes send their energy in the same direction as the fluid 20. A zero-center meter 26, for example a galvanometer, is connected between one opposite pair of junction points 18 and 19 of the bridge circuit. A source of energizing voltage 27 of suitable frequency for energizing the transducers is connected between the remaining pair of opposite junction points 16 and 17.

In operation, the bridge 15 is energized by the source 27 and balanced so that there is no deflection of the meter 26 when there is no relative motion between the transducers 11 to 14 inclusive and the fluid 20. At this time points 18 and 19 are at the same potential level somewhere between the limits of the potential difference applied between points 16 and 17. When the fluid 20 is in motion as shown in Fig. 1, the two transducers 11 and 13 which face approaching fluid each undergo an increase in radiation resistance, while the radiation resistance of each of the other two transducers 12 and 14 simultaneously decreases, inasmuch as they are aimed toward receding fluid. Thus, on one side of the bridge 15, the total resistance between points 19 and 16 increases, while the total resistance between points 19 and 17 decreases, so that point 19 assumes a potential nearer to that of point 17; and, on the other side of the bridge, the total resistance between points 17 and 18 increases, while the total resistance between points 16 and 18 decreases, so that point 18 assumes a potential nearer to that of point 16. This displacement of the potentials of points 18 and 19 in opposite directions, respectively, establishes a potential difference between points 18 and 19 of which the sense depends on the direction 35 of fluid flow, and the magnitude depends on the velocity of fluid flow with respect to the transducers. The meter 26 indicates the sense by the direction in which its needle is deflected. The meter can be calibrated to indicate directly the velocity of flow of a particular fluid.

It will readily be appreciated that the invention is suitable for detecting and measuring the velocity of the flow of both liquids and gases. Optimum performance will be possible when the diameters of the transducers are all large enough in terms of the wavelength of sound in the medium at the frequency being employed so that substantially the ultimate impedance of the medium, $\rho c$, is presented to each square centimeter of the radiating surface of the transducer. "$\rho$" is the density of the medium in mas per unit volume, and "$c$" is the velocity of sound in the medium. With such a transducer, as set forth in "Vibration and Sound" by P. M. Morse; McGraw-Hill Book Co., Inc., New York 1936, pages 258 to 261, inclusive, the resistive component of the impedance of the medium is large compared with the reactive component, which is nearly negligible and can be easily tuned out in the bridge circuit. The reactive component may be tuned out by using a variable reactance element in series with each of the transducers as shown, for example, in Fig. 1. These reactive elements 91 may be variable capacitances or inductances depending upon the type of transducers used. They may be used in a similar way in the circuits of Figs. 5, 9 and 10, although for simplicity they have been omitted from the latter figures. Further, as shown on page 260, of the aforementioned book, in Fig. 71, with diameters of sufficient size, these two components have substantially steady values; hence the present use of the term "ultimate impedance." The directive transducers 11 to 14, inclusive have the foregoing characteristics.

With the reactive component of the ultimate impedance as converted to an electrical impedance by the action of the transducer tuned out, as may be done for a particular transducer in any well-known manner, each transducer 11, 12, 13, and 14 represents at its terminals the electrical counterpart of the mechanical radiation resistance of the transducer plus its internal loss resistance. If the four transducers are substantially identical, the internal loss resistances of all will be the same and will have no effect on the bridge balance. Then, if the efficiency of the transducers be known, a given percentage change in the mechanical radiation resistance of each transducer is reflected as the same percentage change in the electrical resistance of the transducer multiplied by its overall efficiency. For example, a single directive transducer of a kind suitable for underwater use was tested in sea water. The transducer was connected in one arm of an impedance bridge like that of Fig. 1, the other three arms having fixed impedance elements. The bridge was energized at 25 kc./sec. and balanced, and the transducer was then immersed in sea water moving at six knots. The electrical counterpart of the radiation resistance was measured with the transducer aimed first forward (or toward approaching water) and then aft (or toward receding water). A difference of three parts in 2440 was observed, the radiation resistance being higher pointing forward and less pointing aft. The change in electrical radiation resistance of the transducer is proportional to the change in the mechanical radiation resistance of the transducer, which is, in turn dependent upon the change in speed of the radiated sound. The speed of the radiated sound in sea water, having no relative velocity with respect to the transducer, is 2900 knots. When there is a relative velocity of 6 knots, it is expected that a change in radiated sound speed of 6 knots will occur in one direction when the transducer is pointed forward and 6 knots in the opposite direction when the transducer is pointed aft and, hence, a total change of 12 knots in 2900. If the conversion factor from mechanical to electrical radiation resistance and the efficiency of the transducer is known, the expected change in radiation resistance can be determined. For the transducer used here, the conversion factor is 2440/2900 and the efficiency is 30 percent; and, therefore, the anticipated and observed values are practically identical, for:

$$\frac{2440}{2900} \times .30 \times 12 = 3.03$$

The efficiency of the transducer employed was known to be of this order.

Figure 5:
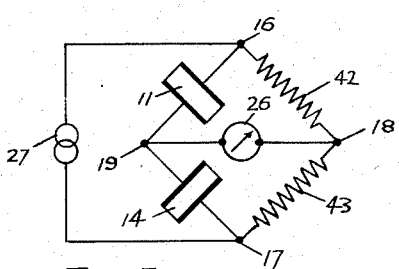
Fig. 5 is the circuit diagram of another embodiment of the invention.

While a single transducer can be used for the purposes of the invention, the use of four transducers in a bridge circuit as shown in Fig. 1 is preferred for two reasons. Firstly, the two transducers 11 and 14, or 12 and 13, in either side of the bridge provide simultaneously the information that was had in the foregoing example by pointing the transducer first forward and then aft. Secondly, the use of two sets of transducers, one in each side of the bridge, provides that each terminal 18 and 19 of the indicator 26 undergoes a change in potential, and, as has been shown, the changes are algebraically additive, so that the observed effect is doubled. If only two transducers are desired, the arrangement illustrated in Fig. 5 may be employed, where two preferably equal resistors 42 and 43 replace the transducers 12 and 13 in one side of the bridge. In Fig. 5 only one indicator terminal 19 undergoes changes in potential level when the bridge is unbalanced. The other terminal 18 remains fixed in potential. In Fig. 5 projector 11 faces forward and projector 14 aft as before.

Figure 2:
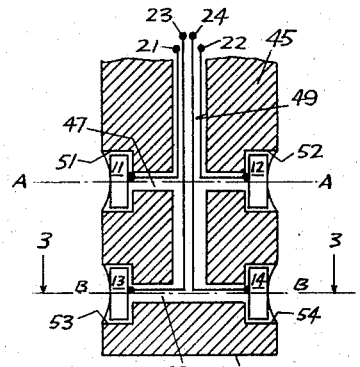
Fig. 2 is a vertical side section of a transducer mounting strut.
Figure 3:
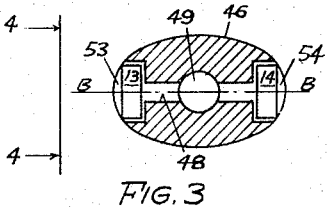
Fig. 3 is a cross-section on line 3—3 of Fig. 2.
Figure 4:
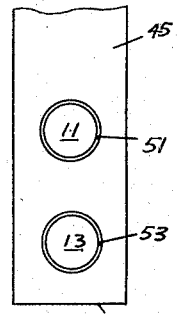
Fig. 4 is a side elevation of the strut of Fig. 2, viewed from line 4—4 of Fig. 3.

For immersion in a moving fluid, the transducers 11 to 14, inclusive, are conveniently supported as shown in Figs. 2, 3 and 4. An elongated strut 45, having for example an elliptic cross-section as shown in Fig. 3, is provided with four recesses 51, 52, 53, and 54, in each of which one of the transducers 11, 12, 13 and 14, respectively, is mounted. The recesses are all located in the narrow sides of the strut, that is, each recess is at the ends of a major axis A—A or B—B of the ellipse, as seen for example in Fig. 3. Two recesses 51 and 52 are located at the ends of major axis A—A at one position along the strut 45 while the remaining two apertures 53 and 54 are located at the ends of major axis B—B at a second position further along the strut 45 toward the free end 46 thereof. The strut 45 is bored through along the major axes A—A and B—B to provide two cross-passageways 47 and 48 connecting each oppositely disposed pairs of recesses 51 and 52, and 53 and 54 together, respectively. A third passageway 49 is provided along the longitudinal axis of the strut 45, connecting with the two cross-passageways 47 and 48. The third passageway extends upward through one end of the strut, but not downward beyond the lower cross-passageway 48. The cables 21 to 24 inclusive are connected to the transducers 11 to 14, respectively, through the passageways 49, and 47 or 48, as may be appropriate.

The disposition of the transducers in the strut 45 is the same as in Fig. 1; that is, transducers 11 and 13 are in one narrow side of the strut, aimed in one direction, parallel to the elliptic major axis, while transducers 12 and 14 are in the other narrow side, aimed in the opposite direction. In operation the strut 45 is inserted into the flowing fluid, with the long dimension perpendicular to the direction of flow and the elliptic major axis parallel thereto. Then the flowing fluid approaches the pair of transducers that are positioned in one narrow side, and recedes from the other pair of transducers. The strut is of sufficient length so that, when the transducers are immersed in a flowing fluid, the cables 21 to 24 inclusive can be brought to the bridge connection 15 outside of the fluid.

The embodiment of the invention shown in Fig. 1, with the transducers mounted and supported in a streamlined strut as shown in Fig. 2, is particularly suitable for measuring the speed of a ship or the like through the water. The strut 45 is then mounted to depend vertically with the free end 46 downward from the bottom of the ship (not shown), being maintained in place in any suitable manner with the cables 21 to 24, inclusive, being brought to the interior of the ship, where the bridge 15, energy source 27, and indicator 26 may be located in suitable places. The elliptic major axis will in such an installation be parallel to the fore-and-aft line of the ship. When the ship is under way, there is relative motion between the transducers and the water, in the correct direction so that the indication provided by the indicator 26 is proportional to the ship's speed.

The navigator of an ocean going ship is interested not only in the forward speed, but also the transverse component of motion, or drift. On long voyages, crosswinds can cause considerable drifting, which is ordinarily determinable only after careful position-fixing. In naval maneuvers, where frequent sharp course changes are often made, transverse motion on curves, akin to the skidding of motor vehicles, is pronounced and must be taken into account. The present invention can be constructed to measure transverse as well as longitudinal motion relative to the water, as shown in Figs. 6, 7 and 8.

Figure 6:
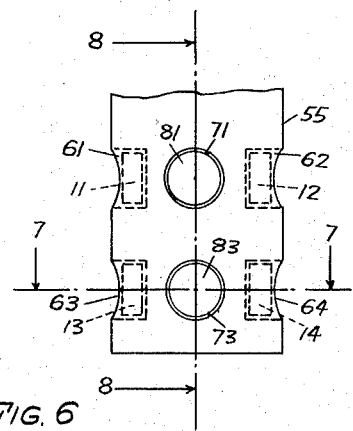
Fig. 6 is a vertical side elevation of the transducer array of still another embodiment of the invention.
Figure 7:
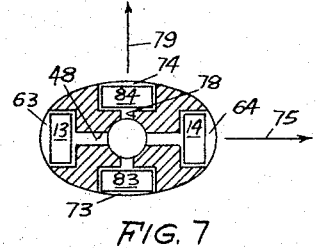
Fig. 7 is a cross-section on line 7—7 of Fig. 6.
Figure 8:
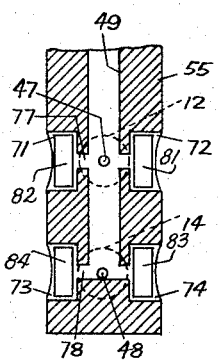
Fig. 8 is a vertical section on line 8—8 of Fig. 6.

In Figs. 6, 7 and 8 a strut 55, similar to the strut 45 of Fig. 2, is provided with recesses 61, 62, 63 and 64, two in each narrow wall, for the mounting of the first set of four transducers 11, 12, 13, and 14, respectively, for longitudinal motion determination, in the same manner as they are mounted in Fig. 2. In addition, the strut 55 is provided with four more recesses 71, 72, 73, and 74, of which two, 71 and 73, are in one wide wall and the other two 72 and 74, are in the other wide wall. In each of the wide-wall recesses there is disposed a directive transducer 81, 82, 83, and 84, respectively, of a second set for transverse motion determination. The two transverse transducers 81 and 83 in one side are aimed away from the strut 55 in one direction, transverse to the direction-line of the first four transducers 11 to 14, inclusive, and the other two transverse transducers 82 and 84 in the other side are aimed in the opposite direction. The longitudinal and transverse directions are indicated by arrows 75 and 79, respectively, in Fig. 7. Passageways 77 and 78 are provided for wires to the transversely directed transducers. In addition the passageways 47, 48, and 49 found in the strut 45 of Fig. 2 are also provided, with passageway 49 connecting to all the others.

Figure 9:
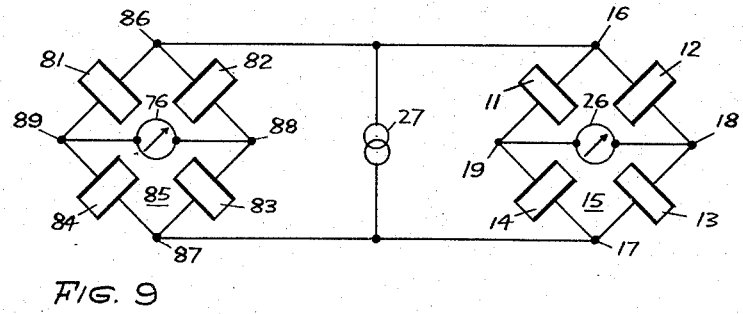
Fig. 9 is the circuit diagram of a complete system employing the array of Figs. 6, 7 and 8.

The longitudinally directed transducers 11 to 14, inclusive, are connected in the bridge circuit 15, as shown in Fig. 9, in the same manner as in Fig. 1, with the same source of energy 27 connected to junctions 16 and 17. In addition, a second similar bridge circuit 85 is connected at one pair of opposite terminals 86 and 87 across the source 27 and has an indicator 76, similar to the indicator 26 of bridge 15, connected between the other pair of opposite terminals 88 and 89. The transversely directed transducers 81 to 84, inclusive, are connected one in each arm of the second bridge 85, with those on one side of the strut 55 being connected in one pair of opposite arms, and those on the other side of the strut connected in the other pair of opposite arms in the same manner as the longitudinally directed transducers 11 to 14, inclusive, are connected in the first bridge 15. The second bridge 85 operates to detect and measure transverse lateral motion (arrow 79) with respect to the water in the same manner as the first bridge 15 operates to detect and measure forward or longitudinal motion (arrow 75).

For measuring the speed of a ship through the water, the invention is substantially independent of the change in speed of sound in the water due to variations in temperature and salinity of the water. At zero speed, there is no effect, for all four transducers in the bridge are affected equally. When there is motion, and hence speed, the error due to these causes is small. It can be eliminated by various expedients. For the accuracies ordinarily required it can be neglected.

Figure 11:
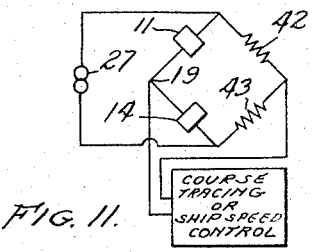
Fig. 11 is the circuit diagram of another embodiment of the invention.

The voltage that is available to an indicator may be used for any purpose desired without departing from the spirit and scope of the invention. For example, this voltage may be linked by a servo-mechanism of any desired kind to the course tracing and/or controlling mechanisms commonly found aboard seagoing vessels as shown in Fig. 11. It is also contemplated that the strut 45 or 55 may be surrounded with a smooth sound transparent membrane or cover to streamline it as desired; or that the front faces of the various transducers along it may be covered with such a material so that the streamlining will be maintained smooth. Such membranes and their employment are well known, and are therefore not illustrated. Pure gum rubber is commonly used for this purpose when the transducers are immersed in water. To reduce the size of the strut for the purpose of minimizing drag, it is contemplated that frequencies of the order of one megacycle per second can be employed. At such a frequency, a quartz plate ¾ of an inch in diameter affords a highly directive transducer.

Figure 10:
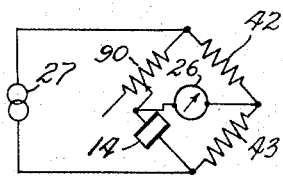
Fig. 10 is a circuit diagram of an embodiment of the invention utilizing a single transducer.

If desired, a single transducer can be used in a practical embodiment of the invention, said transducer being preferably aimed ahead of the craft on which it is mounted. In such a system the circuit shown in Fig. 5 could be used with a variable resistor substituted for transducer 11. Fig. 10 illustrates an embodiment of the invention utilizing a single transducer 14 connected in series with a variable resistor 90. The series combination of transducer 14 and variable resistor 90 are connected in parallel with both the series combination of resistor 42 and resistor 43 and source 27. Meter 26 has one lead connected intermediate variable resistor 90 and transducer 14 and the other lead connected intermediate resistor 42 and resistor 43. The variable resistor would be adjusted for zero reading on the meter 26 for zero speed of the craft through the water and the meter 26 would have a calibrated scale indicating the speed of the craft through the water. In such a system the radiation resistance of the transducer is established by adjustment of the variable resistor to a zero reading of the meter at a zero speed of the craft whereby the radiation resistance of the transducer is equal to the resistance of the variable resistor.

The current flow to the meter as the craft moves through the water in then proportional to the change in resistance of the transducer with speed, and, hence, the meter in effect compares the difference between the output signal applied to the transducer when no relative velocity exists between the transducer and the fluid, and said output signal when a relative velocity exists between the transducer and the fluid through which the craft carrying the transducer is moving.

It is to be clearly understood that other circuits than those illustrated herein could be used for measuring the difference in the radiation resistance of the transducer for different speeds of the transducer through the fluid. Accordingly, it is desired that this invention be not limited

What is claimed is:

1. Apparatus for measuring fluid flow velocity comprising an electroacoustic transducer, a source of alternating voltage connected to said transducer for energizing said transducer to produce a beam of sound energy, means supporting said transducer in a flowing fluid, said transducer being oriented in a position to project compressional wave energy in a prescribed direction having a substantial component parallel to the direction of fluid flow, and means for deriving a signal dependent upon the radiation resistance of said transducer.

2. Apparatus for measuring fluid flow velocity comprising an electroacoustic transducer, a source of alternating voltage connected to said transducer for energizing said transducer to produce a beam of sound energy, means supporting said transducer in a flowing fluid, said transducer being oriented in a position to project compressional wave energy in a prescribed direction having a substantial component parallel to the direction of fluid flow, bridge means including said electroacoustic transducer for providing a zero output signal in the absence of fluid flow and for providing a non-zero output signal when relative motion exists between said transducer and said fluid, and output load means responsive to said output signal of said bridge means.

3. Apparatus for measuring fluid flow velocity comprising: an electroacoustic transducer, a source of alternating voltage connected to said transducer for energizing said transducer to produce a beam of sound energy, means supporting said transducer in a flowing fluid, said transducer being oriented in a position to project compressional wave energy in a prescribed direction having a substantial component parallel to the direction of fluid flow, means connected in circuit with said transducer for deriving a signal dependent upon the ultimate impedance of said fluid in terms of the radiation resistance of said transducer in the absence of fluid flow, and means for measuring the change in said signal when a relative velocity exists between said fluid and said transducer.

4. Apparatus for measuring fluid flow velocity comprising: an electroacoustic transducer having a wave-projecting surface the area of which has lineal dimensions which are everywhere many times greater than the length of the wave produced in the fluid at the operating frequency; means connected to said transducer for energizing said transducer with alternating voltage at said frequency; means supporting said transducer in a flowing fluid, said transducer being oriented in a position to project waves in a prescribed direction having a substantial component parallel to the direction of fluid flow; means connected in circuit with said transducer for deriving a signal dependent upon the ultimate impedance of said fluid in terms of the radiation resistance of said transducer in the absence of fluid flow; and means for measuring the change in said signal when a relative velocity exists between said fluid and said transducer.

5. Electrical apparatus comprising first and second directive electroacoustic transducers, means to support said transducers in a flowing fluid, said transducers being oriented with their directive axes in opposite directions having substantial components parallel to the direction of fluid flow, means to energize said transducers to produce first and second beams of compressional wave energy, and means connected to said transducers to measure the change in radiation resistance of the first transducer with respect to the change in radiation resistance of the second transducer.

6. Apparatus for measuring fluid flow velocity comprising a series circuit including a directive electroacoustic transducer and a variable resistance means, fixed resistance means, a source of alternating voltage to which said series circuit and said fixed resistance means are connected in parallel, voltage sense and magnitude indicating means connected between said series circuit and said fixed resistance means, and means supporting said transducer in a flowing fluid whereof the velocity is to be measured, said transducer being oriented to project compressional wave energy in a direction having a substantial component parallel to the direction of fluid flow, said variable resistance and said fixed resistance means having resistance values which are related in a known fixed manner to the ultimate impedance of said fluid in terms of the radiation resistance of said transducer in said fluid at rest.

7. Apparatus for measuring fluid flow velocity comprising: first and second directive electroacoustic transducers; a source of alternating voltage for energizing said transducers, said transducers being connected in a first series circuit across said source; a second series circuit of two impedance elements connected across said source; voltage sense and magnitude indicating means connected between the junction point of said transducers and the junction point of said impedance elements; and means for supporting said transducers in a fluid whereof the velocity is to be measured in a position to project compressional wave energy in opposite directions parallel to the direction of fluid flow.

8. Apparatus for measuring fluid flow velocity comprising: first, second, third, and fourth directive electroacoustic transducers; a source of alternating voltage having first and second output terminals for energizing said transducers; said first and second transducers being connected in series from said first to said second output terminals; said third and fourth transducers being connected in series from said second to said first terminals; voltage sense and magnitude indicating means connected between the junction point of said first and second transducers and the junction point of said third and fourth transducers; and means for supporting all of said transducers in a fluid whereof the velocity is to be measured, said first and third transducers being positioned to project compressional wave energy in a direction parallel to the direction of fluid flow and said second and fourth transducers being positioned to project such energy in the opposite direction.

9. Apparatus as set forth in claim 8 wherein each of said transducers has substantially the same radiation resistance when there is no fluid motion.

10. Apparatus for measuring fluid flow velocity comprising: an elongated strut being adapted for immersion in a flowing fluid with its long dimension substantially perpendicular to the direction of flow and having a front face approached by the flowing fluid and a rear face from which said fluid recedes; said strut being provided with a first recess in said front face and a second recess in said rear face; first and second directive electroacoustic transducers mounted in said first and second recesses, respectively, with the vibratory surfaces thereof aimed in opposite directions; said strut being further provided with passageways within said strut communicating with said transducers and the exterior of said strut; a source of energizing voltage for said transducers, conductors connecting said transducers in series across said source, said conductors passing through said passageways; and electrical means connected to said transducers through said passageways for measuring the total net change in the radiation resistance of both of said transducers as a result of said fluid flow.

11. Apparatus for measuring fluid flow velocity comprising: an elongated strut being adapted for immersion in a flowing fluid with its long dimension substantially perpendicular to the direction of flow and having a front face approached by the flowing fluid and a rear face from which said fluid recedes; said strut being provided with a first recess in said front face and a second recess in said rear face; first and second directive electroacoustic transducers mounted in said first and second recesses, respectively, with the vibratory surfaces thereof aimed in opposite directions; a source of energizing voltage for said transducers; conductors connecting said transducers in series across said source, and electrical means connected to said transducers for measuring the total net change in the radiation resistance of both of said transducers as a result of said fluid flow.

12. Apparatus for measuring fluid flow velocity comprising: an elongated strut being adapted for immersion in a flowing fluid with its long dimension substantially perpendicular to the direction of flow and having four side surfaces; said strut being provided with a recess in each side surface; first, second, third, and fourth directive elastroacoustic transducers mounted one in each recess, said first and second transducers being aimed in opposite directions lying on a first line, and said third and fourth transducers being aimed in opposite directions lying on a second line substantially perpendicular to said first line; said strut being further provided with passageways within said strut communicating with all of said transducers and the exterior of said strut; a source of energizing voltage for said transducers; conductors connecting said first and second transducers in a first series circuit across said source, and said third and fourth transducers in a second series circuit across said source; said conductors passing through said pasageways; electrical means connected to said first and second transducers through said passageways for measuring the total net change in the radiation resistance of said first and second transducers as a result of fluid flow parallel to said first line; and electrical means connected to said third and fourth means through said passageways for measuring the total net change in the radiation resistance of said third and fourth transducers as a result of fluid flow parallel to said second line.

13. Apparatus for measuring fluid flow velocity comprising: an elongated strut being adapted for immersion in a flowing fluid with its long dimension substantially perpendicular to the direction of flow and having four side surfaces; said strut being provided with a recess in each side surface; first, second, third, and fourth directive electroacoustic transducers mounted one in each recess, said first and second transducers being aimed in opposite directions lying on a first line, and said third and fourth transducers being aimed in opposite directions lying on a second line substantially perpendicular to said first line; a source of energizing voltage for said transducers; conductors connecting said first and second transducers in a first series circuit across said source, and said third and fourth transducers in a second series circuit across said source; electrical means connected to said first and second transducers for measuring the total net change in the radiation resistance of said first and second transducers as a result of fluid flow parallel to said first line; and electrical means connected to said third and fourth transducers for measuring the total net change in the radiation resistance of said third and fourth transducers as a result of fluid flow parallel to said second line.

14. Electrical apparatus comprising first and second directive electroacoustic transducers, a source of voltage for energizing said transducers, said transducers being connected in a first series circuit across said source, a second series circuit of two impedance elements connected across said source, voltage sense and magnitude indicating means connected between the junction of said transducers and the junction of said impedance elements, and means for supporting said transducers in a flowing fluid in a position to project compressional wave energy in opposite directions, having substantial components parallel to the direction of fluid flow.

15. Electrical apparatus comprising first, second, third and fourth directive electroacoustic transducers, means connected to said transducers to energize said transducers to produce first, second, third and fourth beams of compressional waves, respectively, said first and second transducers being connected in a first series circuit across said energizing means and said third and fourth transducers being connected in a second series circuit in the opposite direction across said source, voltage sense and magnitude indicating means connected between the junction of said first and second transducers and the junction of said third and fourth transducers, and means to support said transducers in a flowing fluid to direct said first and third beams in a first prescribed direction and to direct said second and fourth beams in the opposite direction, said directions each having a substantial component parallel to the direction of fluid flow.

References Cited in the file of this patent

UNITED STATES PATENTS

| | | |
|---|---|---|
| 1,935,445 | Heinz | Nov. 14, 1933 |
| 1,974,920 | Hecht | Sept. 25, 1934 |
| 1,985,251 | Hayes | Dec. 25, 1934 |
| 2,394,461 | Mason | Feb. 5, 1946 |

UNITED STATES PATENT OFFICE
CERTIFICATE OF CORRECTION

Patent No. 2,896,449                                         July 28, 1959

Edwin E. Turner

It is hereby certified that error appears in the printed specification of the above numbered patent requiring correction and that the said Letters Patent should read as corrected below.

Column 6, line 63, for "in", first occurrence, read -- is --; column 9, line 25, for "pasageways" read -- passageways --.

Signed and sealed this 12th day of January 1960.

(SEAL)

Attest:
KARL H. AXLINE
Attesting Officer

ROBERT C. WATSON
Commissioner of Patents